(12) United States Patent
Schober et al.

(10) Patent No.: US 6,457,083 B1
(45) Date of Patent: Sep. 24, 2002

(54) COMMUNICATION ON NON-CONTINUOUSLY SAMPLED LINES

(75) Inventors: Bruce W Schober; Steven L Brittenham, both of Boise; Mark A Rau, Nampa; William P Proctor, Boise, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/324,287

(22) Filed: Jun. 2, 1999

(51) Int. Cl.[7] .......................... G06F 13/14; G06F 13/36; G06F 15/177; G06F 1/24
(52) U.S. Cl. ........................ 710/305; 710/311; 713/1; 713/2; 713/100
(58) Field of Search .................. 710/311, 305; 713/1, 2, 100

(56) References Cited

U.S. PATENT DOCUMENTS 4,674,007 A * 6/1987 Tragen ..................... 361/772
5,014,193 A * 5/1991 Garner et al. .................. 710/10
5,023,831 A * 6/1991 Bonke et al. .................. 710/16
6,145,019 A * 11/2000 Firooz et al. .................. 710/8

* cited by examiner

*Primary Examiner*—Peter Wong
*Assistant Examiner*—Tim Vo
(74) *Attorney, Agent, or Firm*—Alexander J. Neudeck

(57) ABSTRACT

A communication channel that is accessible when the product is entirely assembled, but appears to be, and functions like, configuration jumpers to the end user. The communication channel utilizes the terminals of a configuration jumper block as communication paths to an interface device. The terminals of the configuration jumper block may be wired differently depending on the desired function (i.e. send data, receive data, etc.) of the terminals. The configuration information needed by the device is read from the terminals of the configuration block when the communication channel is not active. Switches on the interface device are used to set the configuration information. Configuration jumpers that can be used are the Master, Slave, and Cable Select signals for an ATAPI interface.

19 Claims, 3 Drawing Sheets

US 6,457,083 B1

COMMUNICATION ON NON-CONTINUOUSLY SAMPLED LINES

FIELD OF THE INVENTION

This invention relates generally to communicating data. More particularly, this invention relates to communicating data on signals that are normally static, such as configuration jumper signals.

BACKGROUND OF THE INVENTION

Many electronic devices have a communication channel that is used for development, diagnostic, and production functions. For example, a disk drive may have an RS-232 interface connected through a DB-9 connector so that a firmware developer can monitor the internal state and functioning of the disk drive. This same interface may also be used later in a production environment to initiate and monitor a final self-test sequence before packaging and shipping the device to a consumer. Unfortunately, a large connector, such as a DB-9 or DB-25, is unsightly, adds cost, and may be difficult to find room for on the product. Furthermore, it may be desirable to discourage the end user from accessing this interface. The connector can be hidden, and access prevented by placing the connector underneath the case, or skin, of the product. However, if the connector is hidden in this way, it is inaccessible when the product is completely assembled. This makes it impossible to access the communication product after a certain stage of manufacture, and impossible to access when the product is being used in it's intended manner.

Accordingly, there is a need in the art for a communication channel that can function after a product is entirely assembled, but does not advertise its presence. It is desirable that this channel not necessarily require an additional connector. Such a channel should also be capable of communicating both serial and parallel data in both directions. Finally, such a channel should be capable of implementation using existing features that are accessible from the outside of a filly assembled device.

SUMMARY OF THE INVENTION

The invention provides a communication channel that is accessible when the product is entirely assembled, but appears to be, and functions like, configuration jumpers to the end user. This communication channel requires only a small number of additional parts, and possibly even saves money by eliminating the need for a large, expensive connector on each device. The invention is readily adaptable to a variety of interfaces, both standard and non-standard.

An embodiment of a communication channel according to the invention utilizes the terminals of a configuration jumper block as communication paths to an interface device. The terminals of the configuration jumper block may be wired differently depending on the desired function (i.e. send data, receive data, etc.) of the terminals. The configuration information needed by the device is read from the terminals of the configuration block when the communication channel is not active. Switches on the interface device are used to set the configuration information.

DETAILED DESCRIPTION OF THE PREFERRED EMBODIMENTS

Many electronic devices have signals that are sampled only once, or at most a few times during the devices normal operation. These are non-continuously sampled signals. Examples of this type of signal are signals set by a configuration jumper. These jumpers may set some internal configuration information, such as the device address or interrupt number, by determining that state of a set of signals when they are read during a power-up sequence.

Figure 1:
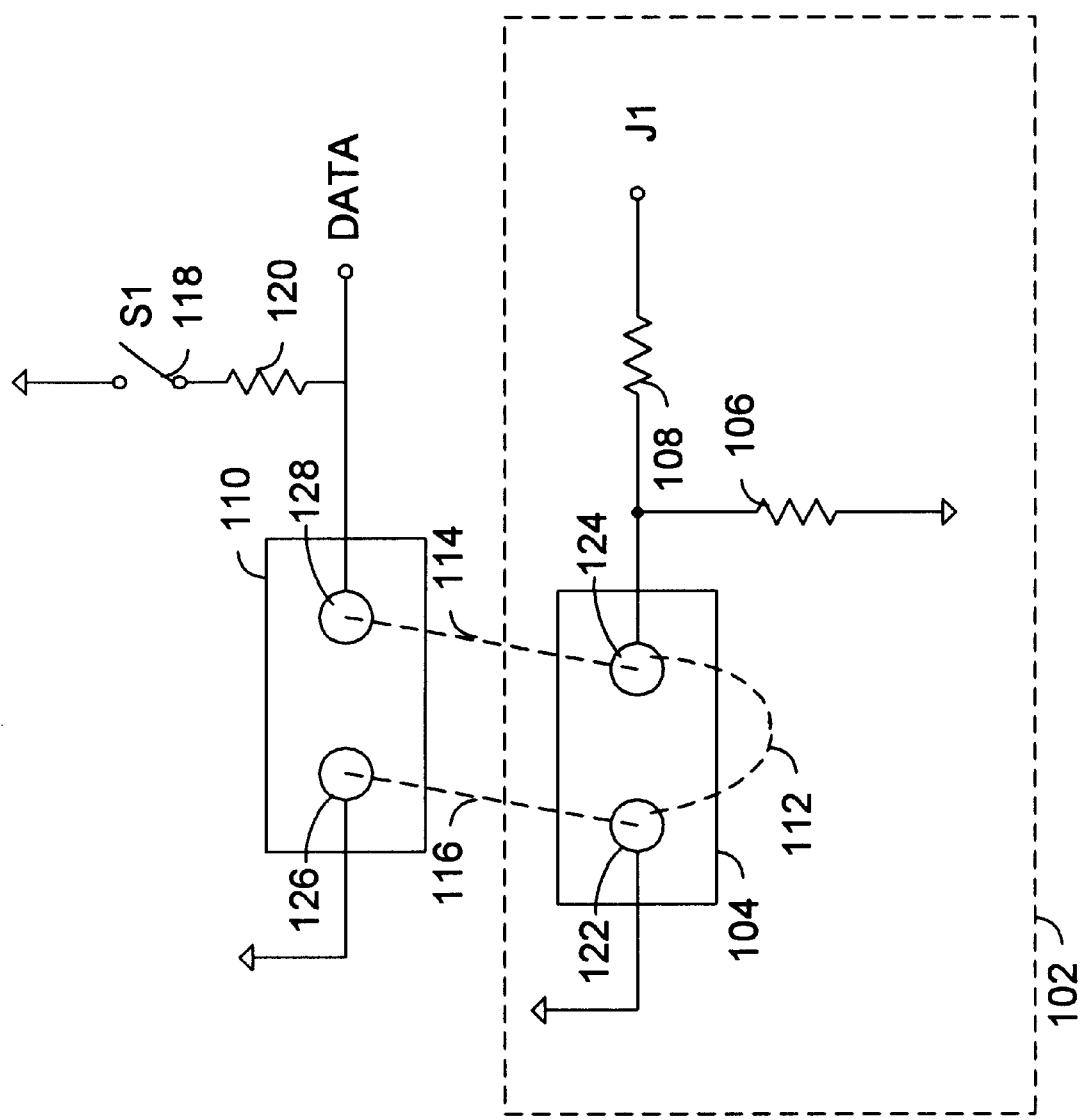
FIG. 1 is a schematic illustration of a communication path that can send and receive data to and from an interface device and a host device using a non-continuously sampled signal.

FIG. 1 is a schematic illustration of a communication path that can send and receive data to and from an interface device and a host device using a non-continuously sampled signal. In FIG. 1, signal J1 is a non-continuously sampled signal. The elements inside box 102 are on the host device. In FIG. 1 terminal 122 of connector 104 is coupled to a positive supply voltage. The other terminal of connector 104, terminal 124, connects to one terminal of resistor 108 and one terminal of resistor 106. The other terminals of resistors 108 and 106 are connected to J1 and a negative supply, respectively. In the preferred embodiment, resistor 108 is 1 KΩ and resistor 106 is 50 KΩ. During normal operation of the host device, jumper 112 may optionally connect the two terminals of connector 104. If jumper 112 is not in place, signal J1 is pulled down through resistors 108 and 106. If jumper 112 is in place, terminal 124 is connected through jumper 112 to a positive supply voltage. This pulls signal J1 high through resistor 108. Resistor 106 prevents the positive supply from being shorted to the negative supply when jumper 112 is in place.

For the host to send data to an interface device, jumper 112, if present, is removed. Connector 110 is then interfaced with connector 104 so that terminal 126 of connector 110 connects to terminal 122 and terminal 128 of connector 110 connects to terminal 124. These connections are shown by dotted lines 116 and 114, respectively. Connection 116 is optional but may be used to provide a positive supply voltage to the interface device. Connector 110, resistor 120, and switch S1 118 are either on or connected to the interface device even when the interface device is not connected to the host device. One terminal of single-pole single-throw switch S1 118 is connected to a positive supply voltage. The other terminal of switch S1 118 is connected to a first terminal of resistor 120. A second terminal of resistor 120 is connected to terminal 128 of connector 110. This node is the DATA node. In the preferred embodiment, resistor 120 is 10 KΩ. When The DATA node may be connected to an RS-232 interface device, a Universal Asynchronous/Synchronous Receiver Transmitter (USART), parallel interface port, or some other input/output device to receive or send data sent to and from the host device on signal J1. In the preferred embodiment, the DATA node is connected to an RS-232 interface device.

With connector 110 in place, the position of switch S1 118 sets the value of signal J1 when signal J1 is sampled. After J1 has been sampled, the host device may send data by overdriving the relatively high impedances of resistor 120 and 106 with a driver or buffer in series with the relatively low impedance of resistor 106. A device on the interface device may send data to the host by overdriving resistor 120 and 106 with a driver or buffer connected to the DATA node.

In FIG. 1, terminal 122 is coupled to a positive supply voltage and resistor 106 is connected to a negative supply voltage. Alternatively, one of ordinary skill in the art would recognize that if terminal 122 were coupled to a negative supply voltage, and resistor 106 were connected to a positive supply voltage, then when jumper 112 was not in place, signal J1 would be pulled high and when jumper 112 was in place, J1 would be pulled low. Switch S1 118 could then be connected to a negative supply voltage instead of a positive supply voltage to set the value of signal J1 when signal J1 is sampled.

Figure 2:
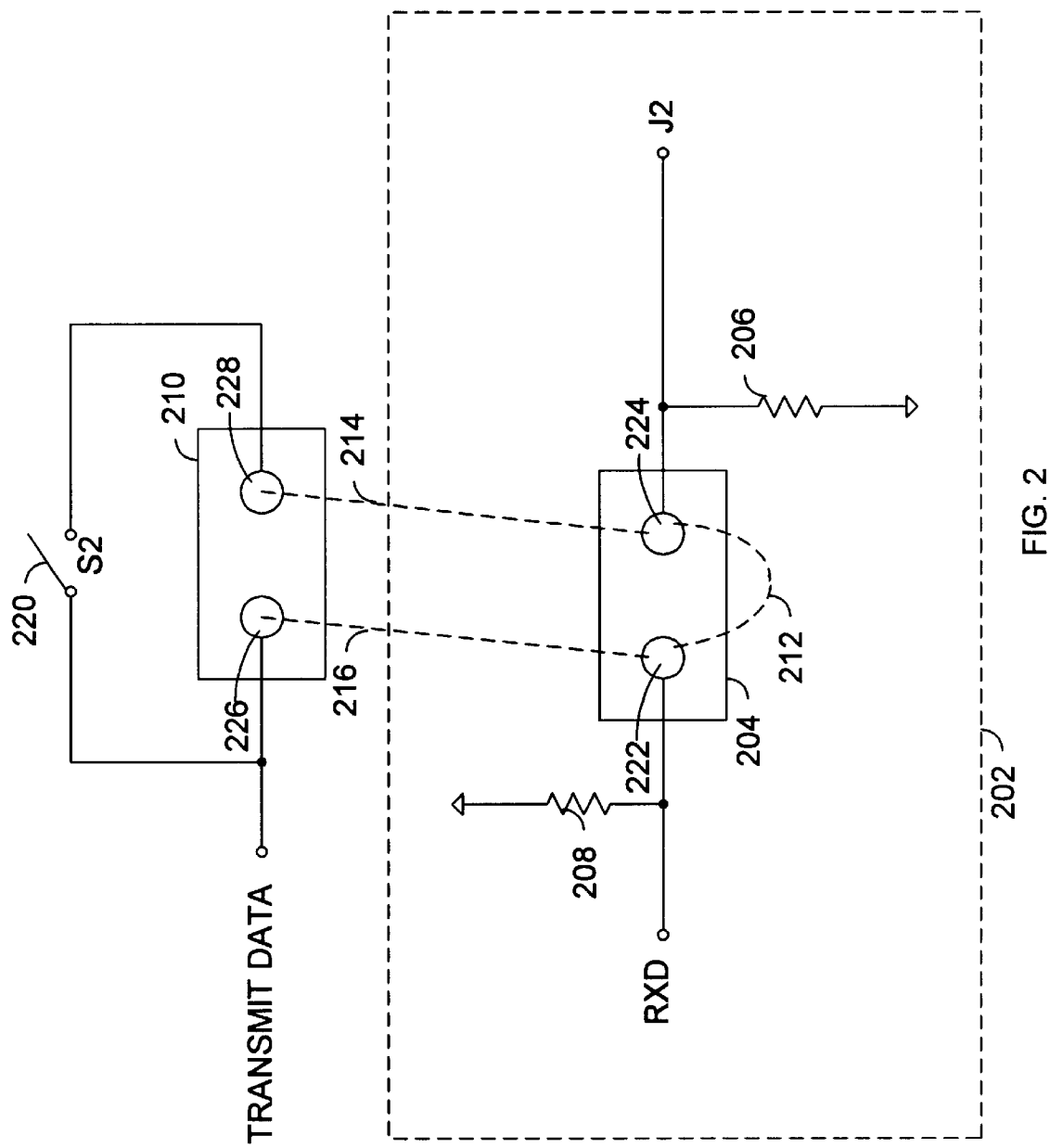
FIG. 2 is a schematic illustration of a communication path that can send data from an interface device to a host device using a non-continuously sampled signal.

FIG. 2 is a schematic illustration of a communication path that can send data from an interface device to a host device using a non-continuously sampled signal. In FIG. 2, signal J2 is a non-continuously sampled signal. The elements inside box 202 are on the host device. In FIG. 2 terminal 222 of connector 204 is coupled to a positive supply voltage through resistor 208. Terminal 222 is the RXD node of the host device. The other terminal of connector 204, terminal 224, is connected to signal J2, which also connects to one terminal of resistor 206. The other terminal of resistor 206 is connected to a negative supply voltage. In the preferred embodiment, resistor 208 is 10 KΩ and resistor 206 is 50 KΩ. During normal operation of the host device, jumper 212 may optionally connect the two terminals of connector 204. If jumper 212 is not in place, signal J2 is pulled down through resistor 206. If jumper 212 is in place, terminal 224 is pulled up through jumper 212 and resistor 208 to a positive supply voltage. This pulls signal J2 high. Resistor 206 prevents the positive supply from being shorted to the negative supply when jumper 212 is in place.

For the interface device to send data to host, jumper 212, if present, is removed. Connector 210 is then interfaced with connector 204 so that terminal 226 of connector 210 connects to terminal 222 and terminal 228 of connector 210 connects to terminal 224. These connections are shown by dotted lines 216 and 214, respectively. Connector 210 and switch S2 220 either are on or connected to the interface device even when the interface device is not connected to the host device. One terminal of single-pole single-throw switch S2 220 is connected to terminal 226 which is the TRANSMIT DATA node. The other terminal of switch S2 220 is connected to terminal 228. Data is placed by the interface device on signal TRANSMIT DATA and is received by the host device on node RXD.

The TRANSMIT DATA node may be connected to an RS-232 interface device, a Universal Asynchronous/Synchronous Receiver Transmitter (USART), parallel interface port, or some other input/output device to send data sent to the host device. In the preferred embodiment, the TRANSMIT DATA node is connected to an RS-232 interface device.

With connector 210 in place, the position of switch S2 220 sets the value of signal J2 when signal J2 is sampled. To function properly, the TRANSMIT DATA node should be held high until J2 has been sampled. In the preferred embodiment, this is easily accomplished since the idle state of an RS-232 line is defined to be high. After J2 has been sampled, the interface device may send data by overdriving the relatively high impedances of resistors 208 and 206 with a driver or buffer.

In FIG. 2, terminal 222 is coupled to a positive supply voltage through resistor 208 and resistor 206 is connected to a negative supply voltage. Alternatively, one of ordinary skill in the art would recognize that if terminal 222 were coupled to a negative supply voltage, and resistor 206 were connected to a positive supply voltage, then when jumper 212 was not in place, signal J2 would be pulled high and when jumper 212 was in place, J2 would be pulled low. The TRANSMIT DATA node would then need to be held low until after the sampling of J2.

Figure 3:
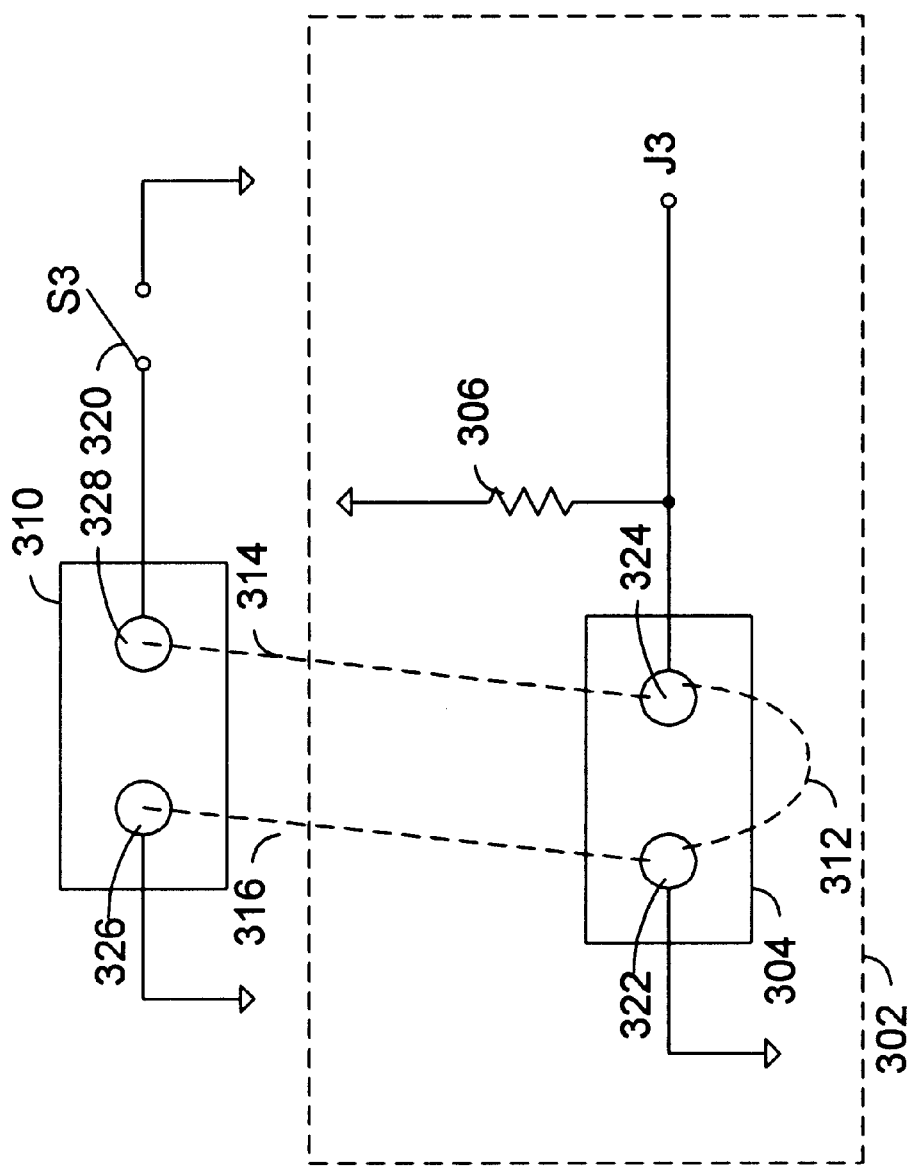
FIG. 3 is a schematic illustration of a communication path that sets a non-continuously sampled signal either by jumper, or by switch on an interface device.

FIG. 3 is a schematic illustration of a communication path that sets a non-continuously sampled signal either by jumper, or by switch on an interface device. In FIG. 3, signal J3 is a non-continuously sampled signal. The elements inside box 302 are on the host device. In FIG. 3 terminal 322 of connector 304 is coupled to a negative supply voltage. The other terminal of connector 304, terminal 324, is connected to signal J3, which also connects to one terminal of resistor 306. The other terminal of resistor 306 is connected to a positive supply voltage. In the preferred embodiment, resistor 306 is 10 KΩ. During normal operation of the host device, jumper 312 may optionally connect the two terminals of connector 304. If jumper 312 is not in place, signal J3 is pulled up through resistor 206. If jumper 312 is in place, terminal 324 is pulled down through jumper 312 by a negative supply voltage. This pulls signal J3 low. Resistor 306 prevents the positive supply from being shorted to the negative supply when jumper 312 is in place.

For the interface device to set the value of J3, jumper 312, if present, is removed. Connector 310 is then interfaced with connector 304 so that terminal 326 of connector 310 connects to terminal 322 and terminal 328 of connector 310 connects to terminal 324. These connections are shown by dotted lines 316 and 314, respectively. Connection 316 is optional, but may be used to establish a common reference level, or provide a negative supply voltage to the interface device. Connector 310 and switch S3 320 either are on or connected to the interface device even when the interface device is not connected to the host device. One terminal of single-pole single-throw switch S3 320 is connected to terminal 328, which is also the J3 signal node. The other terminal of switch S3 320 is connected to a negative supply. With connector 310 in place, the position of switch S3 320 sets the value of signal J3 when signal J3 is sampled.

In FIG. 3, terminal 322 is coupled to a negative supply voltage. Alternatively, one of ordinary skill in the art would recognize that if terminal 322 were coupled to a positive supply voltage, and resistor 306 were connected to a negative supply voltage, then when jumper 312 was not in place, signal J3 would be pulled low and when jumper 312 was in place, J3 would be pulled high.

In the preferred embodiment, the host device has an AT Attachment Packet Interface (ATAPI) channel as one interface to a host computer. Many devices that have ATAPI channel have configuration jumpers to set the ATAPI Master, Slave, and Cable Select configuration. In the preferred embodiment, these configuration jumpers are sampled only on power up and are used with the communication paths described in FIGS. 1, 2, and 3 to provide a bi-directional RS-232 communication channel between the host device and an interface device. This secondary RS-232 link may be used for development, diagnostic, and production functions without requiring the skin of the host device be removed to access a special connector. In the preferred embodiment, the Master configuration jumper terminals are used to send data from the host device to the interface device. This is done using the circuitry and communication path shown in FIG. 1. The Slave configuration jumper terminals are used to send data from the interface device to the host device. This is done using the circuitry and communication path shown in FIG. 2. The Cable Select configuration jumper terminals are set by a switch on the interface device using the circuitry and communication path shown in FIG. 3.

Although several specific embodiments of the invention have been described and illustrated, the invention is not to be limited to the specific forms or arrangements of parts so described and illustrated. The invention is limited only by the claims.

What is claimed is:

1. A communication path, comprising:
   a first connector, said first connector being on a host device, said first connector having at least a first host terminal and a second host terminal, wherein a presence or absence of a connection between said first host terminal and said second host terminal determines a state of a non-continuously sampled signal when said non-continuously sampled signal is sampled; and,
   a second connector, said second connector being attached to an interface device, said second connector interfacing to said first connector, said second connector having at least first interface terminal, said first interface terminal being connected to said first host terminal when said second connector is interfacing to said first connector, said interface device receiving data on said first interface terminal when said data is driven by said host device on said non-continuously sampled signal.

2. The communication path of claim 1, further comprising:
   a switch in series with a first resistor on said interface device, said switch determining the state of said non-continuously sampled signal when said second connector is interfacing to said first connector and when said non-continuously sampled signal is sampled.

3. The communication path of claim 2, further comprising:
   a second interface terminal, said second connector having said second interface terminal, said second interface terminal being connected to said second host terminal when said second connector is interfacing to said first connector.

4. The communication path of claim 3, further comprising:
   a second resistor, said second resistor being connected between said first host terminal and said non-continuously sampled signal; and,
   a third resistor, said third resistor being connected between said first host terminal and a first supply voltage.

5. The communication path of claim 4 wherein said second host terminal is connected to a second supply voltage.

6. A communication path, comprising:
   a first connector, said first connector being on a host device, said first connector having at least a first host terminal and a second host terminal, wherein a presence or absence of a connection between said first host terminal and said second host terminal determines a state of a non-continuously sampled signal when said non-continuously sampled signal is sampled; and,
   a second connector, said second connector being attached to an interface device, said second connector interfacing to said first connector; said second connector having at least first interface terminal, said first interface terminal being connected to said first host terminal when said second connector is interfacing to said first connector, said host device receiving data on said first host terminal when said data is driven by said interface device on said first interface terminal.

7. The communication path of claim 6, further comprising:
   a second interface terminal, said second connector having said second interface terminal, said second interface terminal being connected to said second host terminal when said second connector is interfacing to said first connector; and,
   a switch between said first interface terminal and said second interface terminal on said interface device, said switch determining the state of said non-continuously sampled signal when said second connector is interfacing to said first connector and when said non-continuously sampled signal is sampled.

8. The communication path of claim 7 wherein said second host terminal connects to said non-continuously sampled signal.

9. The communication path of claim 8, further comprising:
   a second resistor, said second resistor being connected between said first host terminal and a first supply voltage; and,
   a third resistor, said third resistor being connected between said second host terminal and a second supply voltage.

10. A method of communicating data, comprising:
    removing a configuration jumper, if present, from a first terminal and a second terminal, wherein said first terminal and said second terminal are on a host device;
    connecting an interface device to at least said first terminal;
    setting the logical state of said first terminal with said interface device; and,
    sending data to said interface device using said first terminal.

11. The method of claim 10 wherein said first terminal and said second terminal are accessible when said host device is fully assembled.

12. The method of claim 11, wherein data sent during said step of sending data is sent serially.

13. The method of claim 12 wherein said host device also has an ATAPI interface.

14. The method of claim 13 wherein said configuration jumper sets the Master signal for said ATAPI interface.

15. A method of communicating data, comprising:
    removing a configuration jumper, if present, from a first terminal and a second terminal, wherein said first terminal and said second terminal are on a host device;
    connecting an interface device to said first terminal and said second terminal;
    setting the logical state of said second terminal with said interface device; and,
    sending data to said host device using said first terminal.

16. The method of claim 15 wherein said first terminal and said second terminal are accessible when said host device is filly assembled.

17. The method of claim 16, wherein the step of sending data is done serially.

18. The method of claim 16 wherein said configuration jumper sets the Slave signal for said ATAPI interface.

19. The method of claim 17 wherein said host device also has an ATAPI interface.

* * * * *

UNITED STATES PATENT AND TRADEMARK OFFICE
CERTIFICATE OF CORRECTION

PATENT NO.   : 6,457,083 B1
DATED         : September 24, 2002
INVENTOR(S)  : Bruce W. Schober et al.

It is certified that error appears in the above-identified patent and that said Letters Patent is hereby corrected as shown below:

Column 1,
Line 40, delete "filly" and insert therefor -- fully --

Column 2,
Line 55, delete "When"

Column 6,
Line 59, delete "filly" and insert therefor -- fully --

Signed and Sealed this

Fourth Day of January, 2005

JON W. DUDAS
*Director of the United States Patent and Trademark Office*